Sept. 23, 1952      J. C. SUTTON ET AL      2,611,604
BABY WEIGHING SCALE
Filed March 20, 1946      2 SHEETS—SHEET 1
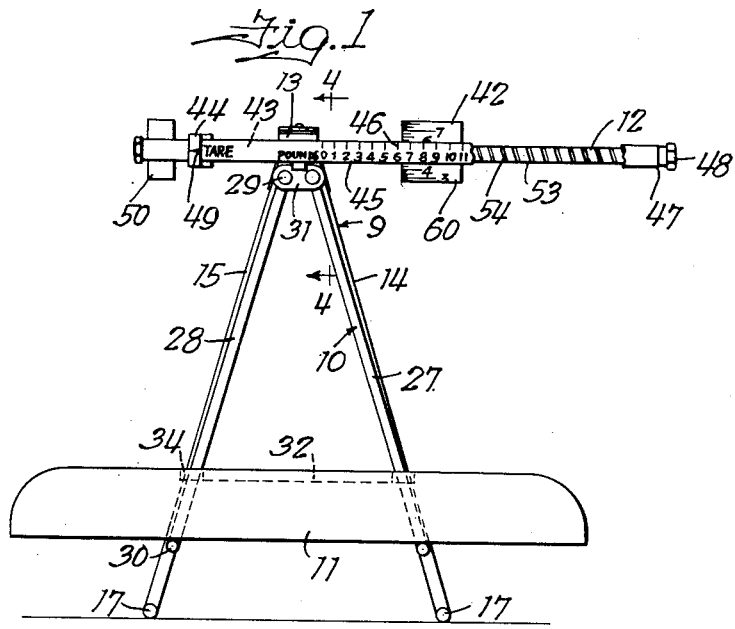
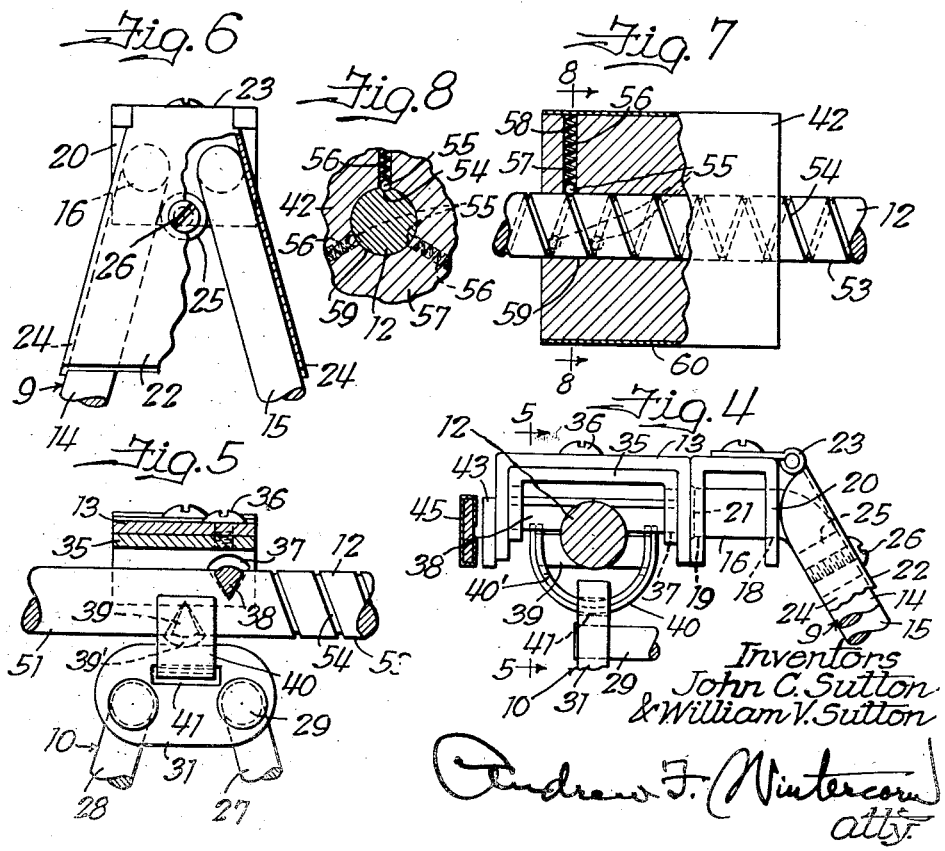

Sept. 23, 1952     J. C. SUTTON ET AL     2,611,604
BABY WEIGHING SCALE
Filed March 20, 1946     2 SHEETS—SHEET 2
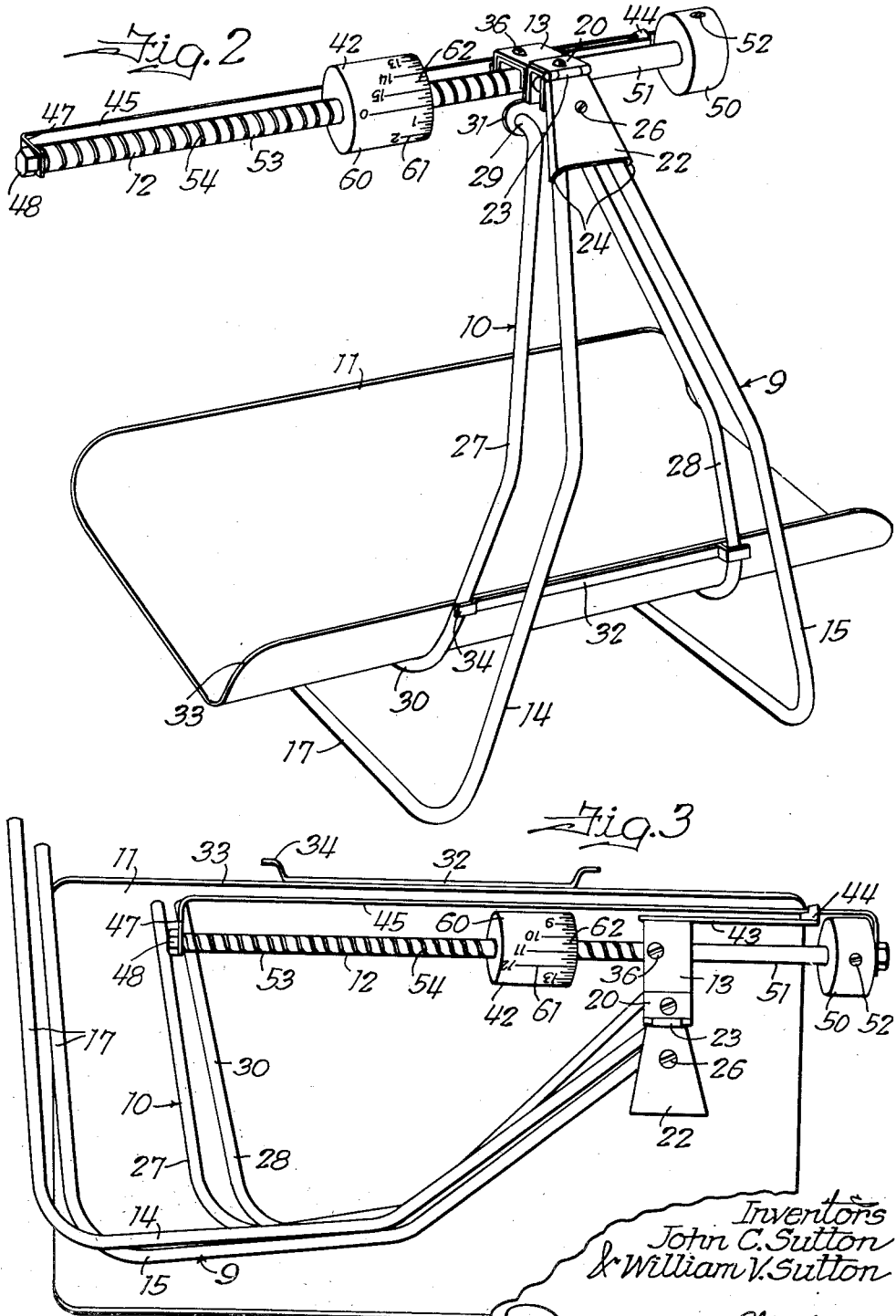

Patented Sept. 23, 1952

2,611,604

UNITED STATES PATENT OFFICE 2,611,604

BABY WEIGHING SCALE

John C. Sutton and William V. Sutton, Rockford, Ill., assignors to Housewares, Inc., Rockford, Ill., a corporation of Illinois Application March 20, 1946, Serial No. 655,724

13 Claims. (Cl. 265—49)

This invention relates to a new and improved baby weighing scale.

Baby weighing scales, as heretofore constructed, were usually of larger, cumbersome, and expensive construction, whereas there has long been a demand for an economical baby weighing scale of reasonably compact construction, to facilitate shipment in the first instance, and storage of the scale by the purchaser when it is not in use. It is, therefore, the principal object of our invention to provide a baby weighing scale of knock-down, foldable construction capable of being placed in a carton only slightly larger than the pan that forms a part of the scale when set up.

One important feature of the baby weighing scale of our invention is the provision of a stand and a cradle for supporting the pan suspended on a beam carried on the stand, the stand and cradle parts being both of bent rod construction for lightness, compactness and economy, these parts both being collapsible to an extremely compact size in relation to the size of the scale when set up, the stand having facilities for quickly securely locking the two legs thereof in the set up position for good support of the cradle, and the two legs of the cradle being arranged to be spread apart and applied to the pan in such a way that there is no danger of these parts shifting relative to one another while the scale is in use.

The scale of our invention also embodies a novel and highly advantageous form of beam and slidable weight, the beam including a cylindrical shaft having a helical groove therein, and the weight having three spring-pressed balls working in the groove in equally circumferentially spaced relation, permitting the weight to be slid on the shaft easily to the approximate position for balancing the weight in the pan, after which a small turn in one direction or the other to thread the weight back or forth for a fine adjustment is enough to get the exact reading, this scale permitting accurate weighing to within a quarter of an ounce, all with a single weight adjustment for pounds and ounces.

The invention is illustrated in the accompanying drawings, in which

Fig. 1 is a front view of a baby weighing scale made in accordance with our invention;

Fig. 2 is a perspective view of the scale taken from the rear to better illustrate the construction, Fig. 2 being on a slightly larger scale than Fig. 1;

Fig. 3 is a plan view of the scale knocked-down, ready for shipment or storage;

Fig. 4 is a cross-section taken on the line 4—4 of Fig. 1 showing the parts substantially full size;

Fig. 5 is a section in a plane at right angles to Fig. 4 taken on the line 5—5 thereof;

Fig. 6 is a rear view of Fig. 4, and

Figs. 7 and 8 are two sectional views illustrating the weight and beam construction, Fig. 8 being a cross-section on the line 8—8 of Fig. 7.

The same reference numerals are applied to corresponding parts throughout the views.

Referring first mainly to Figs. 1 and 2, the reference numeral 9 designates the stand, and 10 the cradle for the scale of our invention, the cradle being adapted to support the pan 11 and being suspended from the beam 12 which in turn is fulcrumed in a bracket 13 carried on the upper end of the stand. The stand 9 and cradle 10 are both of bent rod construction for simplicity and economy and to contribute toward compactness as well as lightness in the folded and packed scale, compactness and light weight being both important factors in the shipment of the scale in the first instance, and also in the handling and storage of the scale by the purchaser when the scale is not in use. See Fig. 3 in which these folded parts 9 and 10 are shown in the pan 11, ready for placing in a packing box or carton. The two legs 14 and 15 of the stand 9 are both bent to a generally C-shape, as indicated in Figs. 2 and 3, and both have horizontally bent upper end portions 16 in parallel relation to the bottom portions 17. The end portions 16 are pivoted in holes 18 and 19 in the two legs of an inverted U-shaped sheet metal bracket 20. The ends 16 are upset or swedged, as indicated at 21 in Fig. 4, to permanently connect the legs 14 and 15 to the bracket 20, and the bracket 20 is welded to the back of the bracket 13, previously mentioned, the latter being also preferably of inverted U-shape. A keystone-shaped sheet metal clasp 22 is hingedly connected by its narrow upper end, as at 23, to the top of the bracket 20 and has forwardly bent flanges 24 which extend in upwardly converging relation for abutment with the outer sides of the legs 14 and 15 at their upper ends to limit the spreading of these legs when the stand is being set up. A cylindrical stud 25 fastened by means of a screw 26 to the inner side of the clasp 22 near the upper end thereof is arranged to be wedged in between the legs in the crotch formed between the upper end portions thereof when the legs are spread apart, as shown in Figs. 2 and 6, whereby to clamp the legs quite firmly in the set up position. There is sufficient frictional resistance to withdrawal of the stud 25 so that there is no danger whatsoever of the stand collapsing once it has been properly set up. The setting up operation can be performed by a woman or any mechanically unskilled person within a few seconds, and, of course, without any need for using any tools, thumb pressure on the clasp 22 being all that is required to complete this assembling operation. It is important to emphasize at this point the C-shape of the stand 9 and cradle 10, because this enables the suspension of the cradle 10 and pan 11 from the upper end of the C-stand and leaves the whole front of the structure open for easy and safe placing of the baby in the pan for weighing and easy removal of the baby thereafter. There is ample stability in the stand 9 because of the spread of the legs 14—15 and the length of their bottom portions 17 and the fact that the cradle 10 is suspended in a vertical plane which intersects said bottom portions at points well to the rear of their front ends. In fact, there is so little danger of the scale tipping that the cradle 10 can actually be used safely for rocking babies, this having been found to quiet an active or restless baby sufficiently to make the weighing operation much easier and more satisfactory than it would be with other scales not adapted to work in this novel way.

The two legs 27 and 28 of the cradle are of bent rod construction and have substantially horizontal upper end portions 29 which are substantially parallel to the bottom portions 30 and are pivoted to a yoke 31 for suspension from the beam 12. A cleat 32 fastened to the upwardly projecting back wall 33 of the pan 11 has rearwardly offset end portions 34 arranged to hook onto the lower end portions of the legs 27 and 28 when they are spread apart and applied to the pan 11, so that these legs cannot come together and they will accordingly support the pan 11 for weighing. It is clear from the showing in Fig. 3 that the legs 27 and 28 of the cradle 10 nest neatly in the C defined by the legs 14 and 15 of the stand 9 when the stand is folded, and inasmuch as the legs of the stand and cradle are both pivoted in relation to the bracket 20 and yoke 31, the stand and cradle are foldable into substantial parallelism with the beam structure for best compactness. It should also be clear in Fig. 3 that the folded scale structure consisting of stand, cradle, and beam are substantially no wider and very little longer than the pan 11 so that the whole scale can be packed in a shipping box or carton that is very little larger and not much, if any, deeper than the pan 11. This obviously is of great importance in the shipment of the scale as well as in the storage of the scale by the purchaser when it is not in use. The convenience in the storage of this scale as well as the ease with which it can be set up are the most important factors along with the reasonably low cost of the scale, in the decision of a new parent to buy this scale in preference to renting at so much per week the standard relatively large non-folding type of scale heretofore used so extensively.

The U-shaped bracket 13 has another U-shaped bracket 35 mounted therein and suitably secured in place by a screw 36, and this bracket 35 is of hardened steel and has generally triangular-shaped holes 37 provided in the opposite side portions thereof in which are fulcrumed the opposite end portions of a hardened knife-edged cross-bar 38 suitably secured in rigid transverse relation to the beam 12. Another hardened knife-edged cross-bar 39, carried on the beam 12 in laterally spaced parallel relation to the bar 38 provides knife-edge fulcrumed support for a U-shaped yoke 40 which is disposed in transverse relation to the yoke 31 previously mentioned and extends freely through a horizontal slot 41 therein. The yoke 40 has an inner U-shaped part 40' of hardened steel in which are generally triangular shaped holes 39' for reception of the ends of the knife-edged cross-bar 39. It should, therefore, be apparent how the cradle 10 is free to rock relative to the beam 12, as described, and also that the weight of the baby in the pan 11 will tend to cause the right hand end of the beam 12 to rise, this weight being balanced in the weighing operation by the adjustment of the weight 42 more or less to the right, according to the weight of the baby. An arm 43 is welded to and extends laterally from the bracket 13, and carries an indicator loop 44 on the outer end thereof through which the index rod 45 that is graduated in pounds, as indicated at 46 in Fig. 1, extends, the ends of the rod 45 being bent rearwardly, as indicated at 47, and fastened to the ends of the beam 12, as by screws 48. In weighing a baby, the weight 42 will be adjusted to the right until the rod 45, which at the outset is tilted with the beam and is resting on the bottom of the indicator loop 44, levels off and assumes a mid position in the loop 44, this position being easily ascertained by noting whether the index mark 49 on the front of the loop 44 is mid-way between the top and bottom edges of the rod 45. A tare weight 50, which is shown as freely slidable on the smooth left hand end 51 of the beam 12, may be threaded on the beam for adjustment, if desired, and is arranged to be releasably secured in adjusted position by means of a set screw 52 threaded in the weight radially for engagement with the beam. This tare weight is adjusted before the baby is placed in the scale to balance the beam 12 with whatever towels or blankets may be used to cover or protect the baby at the time of weighing. In that way, there will be no inaccuracy in weighing and there is no need for any computation to allow for tare weight.

The beam 12, in accordance with our invention, includes a shaft that is cylindrical in form, the entire right hand portion 53 of which, to the right of the knife-edge fulcrum 38, is grooved or threaded helically as indicated at 54 to accommodate one or more hardened steel balls 55, all of one diameter, that are disposed in radial bores 56 in the body 57 of the weight 42. These bores 56 are in equally circumferentially spaced relation and spaced in relation to one another in parallel planes so as to intersect the groove 54 at points in equally circumferentially spaced relation so that all of the balls 55 will work at one time in the groove, the balls 55 being spring-pressed toward engagement in the groove by coiled compression springs 58 entered in the radial bores 56. The body 57 of the weight 42 is cylindrical in form and has an axial bore 59 to receive the grooved shaft portion 53 with a close working fit. The sleeve 60 that encloses the body 57 of the weight 42 is graduated circumferentially in ounces, as indicated at 61, and also in quarter-ounces, as indicated at 62. The pitch of the groove 54 is such that it requires one complete turn of the weight 42 to move the weight axially a distance equivalent to the distance between the one pound graduations 46 on the rod portion 45 of the beam 12, and inasmuch as the sleeve 60 on the weight 42 has sixteen ounce graduations 61 and sixty-four quarter-ounce graduations 62, it is clear that the baby can be weighed to within a quarter-ounce.

In weighing a baby with this improved beam and weight mechanism, the weight 42 is slid on the grooved shaft portion 53 to the right to a point where the beam 12 is nearly balanced, as can be easily detected by noticing when the rod portion 45 of the beam 12 shows a tendency to level off toward a mid position in the indicator loop 44. Then the weight 42 is turned clockwise to "thread" along the grooved shaft portion 53 to whatever slight additional amount may be necessary to secure an exact balance. The weight is then read by reading the pounds indicated to the left of the weight 42 on the index rod 45 and noting the ounces indicated on the dial sleeve 60 on the weight 42. Thus, the weight indicated in Fig. 1 is approximately 6 pounds 6 ounces. The spring-pressed balls 55 are of such enlarged diameter in relation to the width and depth of the groove 54 that they enter the groove only to the extent of about one-third their diameter, or less, and inasmuch as there is only light spring pressure on these balls, they do not offer much resistance to the endwise movement of the weight but will easily and without manual manipulation ride into and out of the groove with an audible clicking sound as the weight is moved endwise in a weighing operation. For example, in weighing the baby whose weight is indicated in Fig. 1, the weight 42 will first be adjusted to the approximate vicinity along the grooved shaft portion 53, to about six pounds, being sure to hear the balls 55 click into the groove 54, and then the weight is turned to secure a threading action for the close adjustment down to an indicated weight of six pounds six ounces.

It is believed the foregoing description conveys a good understanding of the objects and advantages of our invention. The appended claims have been drawn to cover all legitimate modifications and adaptations.

We claim:

1. A foldable weighing scale comprising a foldable two-legged stand, the legs of which are pivoted to a support to be foldable toward each other and have means for securing the same in spread-apart position and in rigid relation to the support, a beam fulcrumed on said support carrying a counterpoise weight on one side of the fulcrum, a foldable two-legged cradle for supporting a weight pan the legs of which are pivotally attached to a yoke suspended from the beam on the other side of the fulcrum, said cradle legs being foldable toward each other, and a weight pan detachably connected to and serving to hold said cradle legs in spread apart operative relationship, the legs of the stand and legs of the cradle being foldable substantially into coplanar relationship with respect to the beam, and the pan being of a width in relation to the dimensions of the legs of the stand and legs of the cradle to accommodate the beam and the foldable stand and cradle on said pan.

2. A foldable weighing scale comprising a foldable two-legged stand, the legs of which are pivoted to a support to be foldable toward each other and have means for securing the same in spread-apart position and in rigid relation to the support, a beam fulcrumed on said support carrying a counterpoise weight on one side of the fulcrum, a foldable two-legged cradle for supporting a weight pan the legs of which are pivotally attached to a yoke suspended from the beam on the other side of the fulcrum, said cradle legs being foldable toward each other, and a weight pan detachably connected to and serving to hold said cradle legs in spread-apart operative relationship, the legs of the stand and legs of the cradle being foldable substantially into coplanar relationship with respect to the beam, and the pan being of a width in relation to the dimensions of the legs of the stand and legs of the cradle to accommodate the beam and the foldable stand and cradle on said pan, said pan being substantially flat and of generally rectangular form with opposed upturned longitudinal edge portions, the height of which edge portions is such that the enclosed space therebetween on the pan will substantially accommodate all of the rest of the folded scale.

3. A weighing scale comprising a knockdown stand which is substantially flat in knocked down condition, a beam support carried thereon, a beam fulcrumed on said support and carrying a counterpoise weight, a knockdown cradle that is foldable to a substantially flat form and formed by two rod members bent to generally C-shape, a yoke pivotally connected to the substantially parallel upper end portions of said last named rod members and suspended on said beam, said cradle rod members being foldable toward each other when not attached to the scale pan, and a scale pan resting on top of the lower portions of said last named rod members and having abutments thereon for detachable connection with the rod members and for holding said lower end portions in spaced apart relation for horizontal support of said pan.

4. A weighing scale comprising a stand formed by two rod members bent to generally C-shape, a beam support pivotally connected to the upper end portions of said rod members, a clasp hingedly connected to said beam support over the pivoted upper ends of said rod members and swingable behind said ends, said clasp carrying abutments for engagement with the outer sides of said rod members near their upper ends to limit separation thereof and carrying also abutment means to engage frictionally between the upper end portions of said rod members to spread the same, whereby to clamp said rod members in a fixed operative relationship to said beam support, a beam fulcrumed on said support and carrying a counterpoise weight, and a load carrier suspended from said beam.

5. A foldable weighing scale comprising a foldable two-legged stand carrying a beam support relative to which said legs are pivoted for holding toward each other, a beam fulcrumed on said support carrying a counterpoise weight on one side of the fulcrum, a foldable two-legged cradle for supporting a weight pan pivotally attached to a yoke suspended from the beam on the other side of the fulcrum, said cradle legs being foldable toward each other, a weight pan detachably connected to and serving to hold said cradle legs in spread apart operative relationship, and a clasp for detachably securing said stand legs in spread apart operative relationship, said clasp being pivoted to said beam support over the upper ends of said stand legs and swingable behind said ends, said clasp carrying abutments for engagement with the outer sides of said stand legs near their upper ends to limit separation thereof and carrying also abutment means to engage frictionally between the upper end portions of said stand legs to spread the same, whereby to clamp said stand legs in a fixed operative relationship to said beam support.

6. In a foldable weighing scale, the combination of a cradle for supporting a weight pan, said cradle having a supporting yoke on the top thereof, and a foldable stand for support of said cradle, comprising a top member on which a beam is fulcrumed carrying a counterpoise weight on one side of the fulcrum and carrying said yoke on the other side of said fulcrum, supporting legs pivotally attached to the top member at their upper ends in laterally spaced relation, and a clasp hingedly attached to said top member over the upper ends of said supporting legs and swingable behind said ends, said clasp carrying abutments for engagement with the outer sides of said legs near their upper ends to limit separation thereof and carrying also abutment means to engage frictionally between the upper end portions of said legs to spread the same, whereby to clamp said legs in a fixed operative relationship to said top member.

7. In a beam type weighing scale, in combination, a beam support, a graduated beam fulcrumed on the support and including a threaded cylindrical shaft in fixed relation thereto, a cylindrical counterpoise weight manually engageable for sliding movement endwise on said shaft, and a plurality of spring pressed balls movable radially inwardly relative to and mounted on the weight in circumferentially and longitudinally spaced relation relative to the shaft so that when any one of the balls engages in the thread the others will also engage therein, said balls being of a diameter appreciably greater than the width and depth of said thread and being arranged to engage in said thread with only sufficient friction to permit rotary threading adjustment of said weight endwise relative to the shaft for fine adjustment, the spring pressure on said balls being light enough to permit the balls to ride easily into and out of the thread when the weight is held against turning and is moved endwise relative to the shaft in either direction, said beam and weight each having a series of indicia for cooperation with each other to indicate the amount of load offset by said weight when it is adjusted to a load-balancing position.

8. In a beam type weighing scale, in combination, a beam support, a graduated beam fulcrumed on the support and including a threaded cylindrical shaft in fixed relation thereto, a cylindrical counterpoise weight manually engageable for sliding movement endwise on said shaft, and a spring pressed ball movable radially inwardly relative to and mounted on said weight that is of a diameter appreciably greater than the width and depth of the thread on said shaft and arranged to engage in the thread with only sufficient friction to permit rotary threading adjustment of said weight endwise relative to the shaft for fine adjustment, the spring pressure on said ball being light enough to permit the ball to ride easily into and out of the thread when the weight is held against turning and is moved endwise relative to the shaft in either direction, said beam and weight each having a series of indicia for cooperation with each other to indicate the amount of load offset by said weight when it is adjusted to a load-balancing position.

9. A weighing scale comprising a stand formed by two rod members bent to generally C-shape, a beam support pivotally connected to the upper end portions of said rod members, a clasp hingedly connected to said beam support over the pivoted upper ends of said rod members and swingable behind said ends, said clasp carrying abutments for engagement with the outer sides of said rod members near their upper ends to limit separation thereof, whereby to hold said rod members in a fixed operative relationship to said beam support, a beam fulcrumed on said support and carrying a counterpoise weight, and a load carrier suspended from said beam.

10. A foldable weighing scale comprising a foldable two-legged stand carrying a beam support relative to which said legs are pivoted for folding toward each other, a beam fulcrumed on said support carrying a counterpoise weight on one side of the fulcrum, a foldable two-legged cradle for supporting a weight pan pivotally attached to a yoke suspended from the beam on the other side of the fulcrum, said cradle legs being foldable toward each other, a weight pan detachably connected to and serving to hold said cradle legs in spread-apart operative relationship, and a clasp for detachably securing said stand legs in spread-apart operative relationship, said clasp being pivoted to said beam support over the upper ends of said stand legs and swingable behind said ends, said clasp carrying abutments for engagement with the outer sides of said stand legs near their upper ends to limit separation thereof, whereby to hold said stand legs in a fixed operative relationship to said beam support.

11. In a foldable weighing scale, the combination of a cradle for supporting a weight pan, said cradle having a supporting yoke on the top thereof, and a foldable stand for support of said cradle, comprising a top member on which a beam is fulcrumed carrying a counterpoise weight on one side of the fulcrum and carrying said yoke on the other side of said fulcrum, supporting legs pivotally attached to the top member at their upper ends in laterally spaced relation, and a clasp hingedly attached to said top member over the upper ends of said supporting legs and swingable behind said ends, said clasp carrying abutments for engagement with the outer sides of said legs near their upper ends to limit separation thereof, whereby to hold said legs in a fixed operative relationship to said top member.

12. A foldable weighing scale comprising a foldable two-legged stand, the legs of which are pivoted to a support to be foldable toward each other and have means for securing the same in spread-apart position and in rigid relation to the support, a beam fulcrumed on said support carrying a counterpoise weight on one side of the fulcrum, a foldable two-legged cradle for supporting a weight pan the legs of which are pivotally attached to a yoke suspended from the beam on the other side of the fulcrum, said cradle legs being foldable toward each other, and a weight pan detachably connected to and serving to hold said cradle legs in spread-apart operative relationship, the legs of the stand and legs of the cradle being foldable substantially into coplanar relationship with respect to the beam.

13. A weighing scale comprising a knockdown stand formed by two rod members bent to generally C-shape, a beam support pivotally connected to the spaced, parallel, horizontal upper end portions of said rod members, the rod members in their set-up operative position extending in downwardly diverging relation from the beam support, means on the beam support for limiting the spreading apart of the rod members, whereby to hold the same in a fixed operative relationship to said beam support, the said rod members being foldable toward one another to a substantially flat form, a beam fulcrumed on said support and carrying a counterpoise weight on one side of the fulcrum, and a load carrier suspended from said beam on the other side of the fulcrum.

JOHN C. SUTTON.
WILLIAM V. SUTTON.

REFERENCES CITED

The following references are of record in the file of this patent:

UNITED STATES PATENTS

| Number | Name | Date |
|---|---|---|
| 502,786 | Storey | Aug. 8, 1893 |
| 734,383 | Whelan | July 21, 1903 |
| 1,295,258 | Becker | Feb. 25, 1919 |
| 1,310,638 | Summers | July 22, 1919 |
| 2,132,919 | Arens | Oct. 11, 1938 |
| 2,285,927 | Hem | June 9, 1942 |
| 2,393,764 | Frank | Jan. 29, 1946 |
| 2,398,065 | Werner | Apr. 9, 1946 |

FOREIGN PATENTS

| Number | Country | Date |
|---|---|---|
| 10,287 | Great Britain | Aug. 5, 1899 |
| 640,404 | France | July 12, 1928 |
| 755,553 | France | Nov. 27, 1933 |